United States Patent
Uzmezler

(10) Patent No.: US 10,908,627 B2
(45) Date of Patent: Feb. 2, 2021

(54) EDGE ANALYTICS CONTROL DEVICES AND METHODS

(71) Applicant: Alper Uzmezler, Austin, TX (US)

(72) Inventor: Alper Uzmezler, Austin, TX (US)

(*) Notice: Subject to any disclaimer, the term of this patent is extended or adjusted under 35 U.S.C. 154(b) by 203 days.

(21) Appl. No.: 15/164,845

(22) Filed: May 25, 2016

(65) Prior Publication Data
US 2017/0343980 A1 Nov. 30, 2017

(51) Int. Cl.
| | | |
|---|---|---|
| G05B 19/406 | (2006.01) | |
| H04L 12/28 | (2006.01) | |
| G05B 19/042 | (2006.01) | |
| G05B 19/409 | (2006.01) | |
| G05F 1/66 | (2006.01) | |
| G05B 15/02 | (2006.01) | |

(52) U.S. Cl.
CPC .............. *G05F 1/66* (2013.01); *G05B 15/02* (2013.01); *H04L 12/2823* (2013.01); *H04L 12/2825* (2013.01); *G05B 2219/2614* (2013.01); *G05B 2219/2642* (2013.01)

(58) Field of Classification Search
CPC .............. G05B 19/406; G05B 19/0425; G05B 19/409; G05B 2219/2614; G05B 2219/2642; G05F 1/66; H04L 12/282
See application file for complete search history.

(56) References Cited

U.S. PATENT DOCUMENTS

| | | |
|---|---|---|
| 5,579,993 A | 12/1996 | Ahmed et al. |
| 5,927,398 A | 7/1999 | Maciulewicz |
| 6,535,138 B1 | 3/2003 | Dolan et al. |
| 6,608,560 B2 | 8/2003 | Abrams |
| 6,667,690 B2 | 12/2003 | Durej et al. |
| 6,859,685 B2 | 2/2005 | Coogan |
| 6,865,449 B2 | 3/2005 | Dudley |
| 6,885,913 B2 | 4/2005 | Coogan |
| 7,069,345 B2* | 6/2006 | Shteyn ................ H04L 12/2803 340/12.32 |
| 7,092,794 B1 | 8/2006 | Hill et al. |
| 7,469,550 B2 | 12/2008 | Chapman et al. |
| 7,571,865 B2 | 8/2009 | Nicodem et al. |
| 7,809,472 B1 | 10/2010 | Silva et al. |
| 7,832,465 B2 | 11/2010 | Zou et al. |
| 7,963,454 B2 | 6/2011 | Sullivan |
| 8,196,185 B2 | 6/2012 | Geadelmann et al. |
| 8,239,922 B2 | 8/2012 | Sullivan et al. |
| 8,550,370 B2 | 10/2013 | Barrett |
| 8,600,559 B2 | 12/2013 | Grohman et al. |

(Continued)

*Primary Examiner* — Charles R Kasenge
(74) *Attorney, Agent, or Firm* — RM Reed Law PLLC

(57) ABSTRACT

In some embodiments, a controller may include a circuit. The circuit may include a network interface configured to couple to a network, a plurality of input/output (I/O) ports configured to couple to a respective plurality of devices, a processor coupled to the network interface and to the plurality of I/O ports, and a memory accessible to the processor. The memory may be configured to store instructions that, when executed, cause the processor to receive data from one or more of the plurality of I/O ports, automatically apply semantic tags to the data, automatically combine the data into a single data stream to determine a pattern, and selectively adjust one or more of a plurality of building operations management tasks in response to determining the pattern.

16 Claims, 13 Drawing Sheets

(56) References Cited

U.S. PATENT DOCUMENTS

| | | |
|---|---|---|
| 8,798,796 B2 | 8/2014 | Grohman et al. |
| 8,924,025 B2 | 12/2014 | Delorme et al. |
| 9,002,481 B2 | 4/2015 | Leen et al. |
| 9,080,782 B1 | 7/2015 | Sheikh |
| 9,103,555 B2 | 8/2015 | Zou et al. |
| 9,134,715 B2 | 9/2015 | Geadelmann et al. |
| 9,152,153 B2 | 10/2015 | Sullivan et al. |
| 9,244,471 B2 | 1/2016 | Watts et al. |
| 9,253,260 B1 | 2/2016 | Bailey et al. |
| 9,303,890 B2 | 4/2016 | Haines et al. |
| 9,310,090 B2 | 4/2016 | Means |
| 10,355,747 B2* | 7/2019 | Gary, Jr. |
| 2002/0169914 A1* | 11/2002 | Shteyn ............... H04L 12/2803 710/305 |
| 2007/0244583 A1* | 10/2007 | Rachut ............... G05B 19/0426 700/83 |
| 2008/0033599 A1 | 2/2008 | Aminpour et al. |
| 2008/0099568 A1 | 5/2008 | Nicodem et al. |
| 2010/0070084 A1* | 3/2010 | Steinberg ............... F24F 11/62 700/276 |
| 2010/0114382 A1 | 5/2010 | Ha et al. |
| 2010/0163633 A1 | 7/2010 | Barrett et al. |
| 2010/0289643 A1* | 11/2010 | Trundle ............... G08C 19/16 340/545.1 |
| 2010/0295700 A1 | 11/2010 | Mauk et al. |
| 2012/0012662 A1 | 1/2012 | Leen et al. |
| 2012/0277916 A1 | 11/2012 | Delorme et al. |
| 2013/0043998 A1* | 2/2013 | Edlund ............... G08B 21/0423 340/573.1 |
| 2013/0234840 A1* | 9/2013 | Trundle ............... G08C 19/16 340/12.53 |
| 2013/0238142 A1 | 9/2013 | Nichols et al. |
| 2013/0297078 A1 | 11/2013 | Kolavennu |
| 2013/0310986 A1 | 11/2013 | Gust et al. |
| 2014/0000861 A1 | 1/2014 | Barrett et al. |
| 2014/0031989 A1 | 1/2014 | Bergman et al. |
| 2014/0031992 A1 | 1/2014 | Bergman et al. |
| 2014/0184406 A1* | 7/2014 | Trundle ............... G08C 19/16 340/539.3 |
| 2014/0200718 A1 | 7/2014 | Tessier |
| 2014/0277768 A1 | 9/2014 | Watts et al. |
| 2014/0330438 A1 | 11/2014 | Haines et al. |
| 2014/0349566 A1 | 11/2014 | Lamb et al. |
| 2014/0350734 A1 | 11/2014 | Grohman |
| 2015/0048679 A1* | 2/2015 | Kotowski ............... H04Q 9/00 307/31 |
| 2015/0057808 A1* | 2/2015 | Cook ............... G05B 13/04 700/275 |
| 2015/0160797 A1* | 6/2015 | Shearer ............... G06F 3/0482 715/740 |
| 2015/0219349 A1 | 8/2015 | Means |
| 2015/0309484 A1* | 10/2015 | Lyman ............... G05B 13/0205 700/275 |
| 2015/0316286 A1 | 11/2015 | Roher |
| 2016/0010888 A1 | 1/2016 | Groskreutz |
| 2016/0088438 A1* | 3/2016 | O'Keeffe ............... H04W 4/21 455/456.2 |
| 2016/0091879 A1* | 3/2016 | Marti ............... H04L 12/2818 700/275 |
| 2016/0131381 A1 | 5/2016 | Schmidlin |
| 2016/0131382 A1 | 5/2016 | Rosen |
| 2016/0202677 A1* | 7/2016 | Trundle ............... G08C 19/16 700/275 |
| 2016/0215996 A1* | 7/2016 | Blair ............... G08B 21/187 |
| 2016/0234186 A1* | 8/2016 | Leblond ............... G06Q 50/163 |
| 2016/0258822 A1* | 9/2016 | Steinberg ............... F24F 11/006 |
| 2017/0176296 A1* | 6/2017 | Gary, Jr. ............... H04B 5/0031 |

* cited by examiner

EDGE ANALYTICS CONTROL DEVICES AND METHODS

FIELD

The present disclosure is generally related to distributed controllers for building automation systems, such as heating, ventilation, and air-conditioning systems, irrigation systems, security systems, lighting, and other systems, which are generally associated with buildings. More particularly, the present disclosure is generally related to edge analytics controller devices configured to receive and analyze data and to control one or more systems in response to the data analysis. Further, the present disclosure may be related to edge analytics controller devices configured to communicate with other edge analytics controllers and other systems through a network and to automatically determine a hierarchy between devices.

BACKGROUND

Building automation systems may utilize multiple air-conditioning units and multiple control devices, sometimes of different types (e.g., pneumatic controls, digital controls, etc.). Direct digital control (DDC) systems using digital-logic controllers and electrically-operated actuators are sometimes used to replace traditional pneumatic controls. Pneumatic systems may use analog-logic controllers and air-pressure actuators. Hybrid systems can use a combination of digital logic controllers and pneumatic actuators.

Conventionally, a building may include one or more device controllers, which may be coupled to one or more devices, such as boilers, chillers, fan units, and the like. Each device controller may communicate with a head end controller, which may in tern communicate with a central workstation (operator-machine interface (OMI) or user interface (UI).

SUMMARY

In some embodiments, an edge device includes a processor and a memory accessible to the processor. The memory may store semantically-tagged and configured instructions that, when executed, cause a processor to provide secure, open-BAS (building automation systems) at-scale. The memory may further include instructions that, when executed, cause the processor to perform analytics processing of large data sets including data received from one or more sensors and optionally data retrieved from memory or from another data source. In some embodiments, the instructions cause the processor to provide an energy analytics controller configured to determine data trends, add semantic tags, and analyze data streams, and to provide control signals to various electronic devices of a building automation system.

In some aspects, by automatically performing trend analysis, applying semantic tags, and analyzing data streams locally and by automatically sharing the analytics results and visualizations among other edge devices, the edge analytics controller devices can open the path to a host of new applications in areas that span building operations, metering, sub-metering, portfolio metering, agriculture (mass and urban), retail analytics, data center infrastructure management (DCIM), business information (BI) analytics, and computerized maintenance management systems, among others. Further, the edge analytics controller devices may be configured to communicate settings and other information with other edge analytics controller devices and to automatically determine a hierarchy between the devices.

In some embodiments, a controller may include a circuit. The circuit may include a network interface configured to couple to a network, a plurality of input/output (I/O) ports configured to couple to a respective plurality of devices, a processor coupled to the network interface and to the plurality of I/O ports, and a memory accessible to the processor. The memory may be configured to store instructions that, when executed, cause the processor to receive data from one or more of the plurality of I/O ports, automatically apply semantic tags to the data, automatically combine the data into a single data stream to determine a pattern, and selectively adjust one or more of a plurality of building operations management tasks in response to determining the pattern. In some aspects, the instructions may also cause the processor to communicate settings and other information to one or more other controllers through the network. The controller may be configured to automatically determine a hierarchy between the controllers based, at least in part, on the communicated information.

In other embodiments, a system may include a plurality of edge analytics controllers. Each edge analytics controller may include a plurality of input/output (I/O) ports configured to receive data from a plurality of devices, a network interface configured to couple to a network, a processor coupled to the I/O ports and to the network interface, and a memory accessible to the processor. The memory may store instructions, when executed, cause the processor to receive data from one or more of the plurality of I/O ports, automatically apply semantic tags to the data, and process the tagged data to manage a plurality of building operations management tasks. Further, in some embodiments, the instructions may also cause the processor to communicate settings and other information to one or more other controllers through the network. The controller may be configured to automatically determine a hierarchy between the controllers based, at least in part, on the communicated information.

In still other embodiments, a controller may include a circuit. The circuit may include a network interface configured to couple to a network, a plurality of input/output (I/O) ports configured to couple to a respective plurality of devices, a processor coupled to the network interface and to the plurality of I/O ports, and a memory accessible to the processor. The memory may be configured to store instructions that, when executed, cause the processor to determine a network address, communicate with one or more other devices through the network to automatically discover one or more other controllers, and automatically determine a hierarchy between the controller and the one or more other controllers. In some aspects, the memory may store instructions, when executed, cause the processor receive data from one or more of the plurality of I/O ports, automatically apply semantic tags to the data, and process the tagged data according to one or more configurable instruction sets.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. Additionally, it should also be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a tablet computer, smartphone, personal computer, server, or any other computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage device or memory device, including instructions that, when executed, cause a processor to perform the methods.

Embodiments of systems are described below that may include one or more edge analytics controllers, which make it possible to eliminate the head end controller devices from building automation systems. In some embodiments, the edge analytics controller may be configured to communicate with various devices, such as sensors, actuators, fans, and other devices through wired or wireless connections and to communicate with other edge analytics controllers or computing devices through a network backbone, such as Ethernet cabling, switching devices, routers, modems, and the like. The edge analytics devices may be configured to receive data, tag the data using a standardized taxonomy (such as a semantic taxonomy), store the tagged data, process the tagged data, and process the tagged data to manage a plurality of building operations management tasks. Further, the edge analytics controller may be configured to optionally communicate settings, parameters, and other information with one or more other controllers through the network and to automatically determine a hierarchy between the controllers based, at least in part, on the communicated information.

Figure 1:
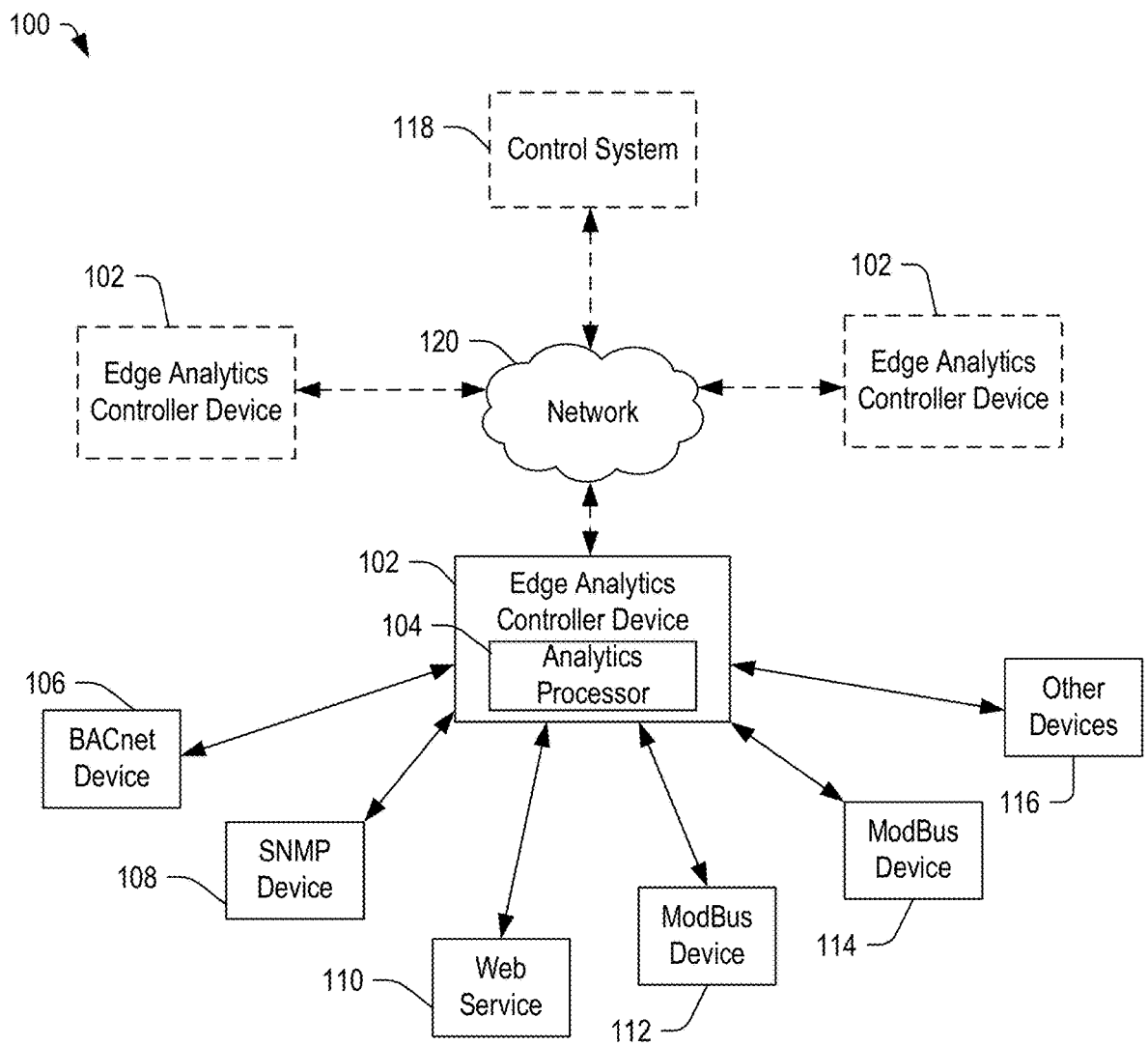
FIG. 1 depicts a block diagram of a system including an edge analytics controller device, in accordance with certain embodiments of the present disclosure.

FIG. 1 depicts a block diagram of a system 100 including an edge analytics controller (EAC) device 102, in accordance with certain embodiments of the present disclosure. The EAC device 102 may be coupled to a Building Automation Control (BAC) network device (or BACnet) 106, a Simple Network Management Protocol (SNMP) device 108, a web service device 110, ModBus devices 112 and 114, and other devices 116. The EAC controller 102 may cooperate with one or more of the devices 106, 108, 110, 112, 114, and 116 to provide heating, ventilation, and air-conditioning (HVAC) control, fire detection and alarm, lighting control, security systems, "smart" elevators, utility company interfaces, other applications, or any combination thereof.

In some embodiments, the EAC device 102 may be coupled to a control system 118 and may be coupled to multiple EAC devices 102 through a network 120. In some embodiments, the control system 118 may be accessed to control the EAC device 102, which may control operation of one of more of the devices, including by polling one or more devices to retrieve data, such as control information, temperature readings, and the like, and by adjusting a parameter of one or more of the devices. In some examples, the control system 118 may be configured to push data, updates, instructions, software applications, and other information to the EAC device 102, which may in turn provide update information to one or more other devices.

The EAC device 102 may include an open source controls engine, which may be configured by a user to perform a variety of operations. Further, the EAC device 102 may include a built-in analytics engine (analytics processor 104), which may be configured to analyze real-time data and historical data to determine run-time anomalies and to generate reports. Further, the EAC device 102 may be configured using an object-based block programming interface, such as a Hyper Text Markup Language (HTML) version five (HTML5) drag-and-drop block programming interface. Through the interface, an operator may create database lookups and calls and bind data to various widgets, which may be configured to provide one or more visualizations based on the data. Additionally, the operator may configure the EAC device 102 to process the data to determine a pattern and to selectively control one or more of a plurality of building operations management tasks based on the determined pattern. In an example, a pattern may include a state of a blower of an HVAC system, a temperature, a humidity, an occupant call (e.g., hot or cold), an environmental condition (e.g., outside air temperature), a time of day, other parameters, and so on. Adjustments may be automatically determined by the EAC device 102 based on the pattern determined from the plurality of data streams.

In some examples, the EAC device 102 may be deployed in conjunction with rooftop units to analyze and visualize data and to control various operations based on the data. The EAC device 102 may be deployed in conjunction with solar panels to provide data aggregation and analytics to track and analyze solar energy production. In some examples, the EAC device 102 may be deployed with energy generation technologies, such as windmills, solar generators, and other devices, to provide peak shifting technologies. In some examples, the EAC device 102 may be deployed with air handling units to optimize control. Further, in some examples, the EAC device 102 may be deployed for data center optimization with the help of built-in analytics to enhance system performance and optimize power usage. Other embodiments are also possible.

In some embodiments, the EAC device 102 may process received data into a data stream, which can be stored in the database together with pre-determined data tags. The tagged data can be analyzed as a stream of time-series data. In certain embodiments, the EAC device 102 may process the stream of time-series data to search for patterns among the run-times. In some embodiments, the patterns may indicate a device fault or other anomaly that may represent an operational mode. The EAC device 102 may identify a pattern within the data and may automatically adjust one or more operational parameters of one or more devices in response to configured rules corresponding to the identified pattern. The EAC device 102 can utilize the detected pattern to determine a binary point or parameter that can be adjusted to change how the system operates in response to determining the pattern or to selectively control one or more of the devices 106, 108, 112, 114, and 116 based on the determined pattern.

In general, the EAC device 102 may be produced in a variety of sizes and configurations, depending on the specific implementation. In a particular example, the EAC device 102 may include four universal inputs and four three-terminal (TRIAC) outputs. In another particular example, the EAC device 102 may include a plurality of inputs and outputs. The inputs can include universal inputs, digital inputs, analog inputs, or any combination thereof. The outputs can include TRIAC outputs, digital outputs, analog outputs, or any combination thereof. In a particular embodiment, the EAC device 102 can include nine inputs (including seven universal inputs and two digital inputs) and can include sixteen outputs (including four TRIAC outputs, eight digital outputs, and four analog outputs). Other embodiments are also possible.

Figure 2A:
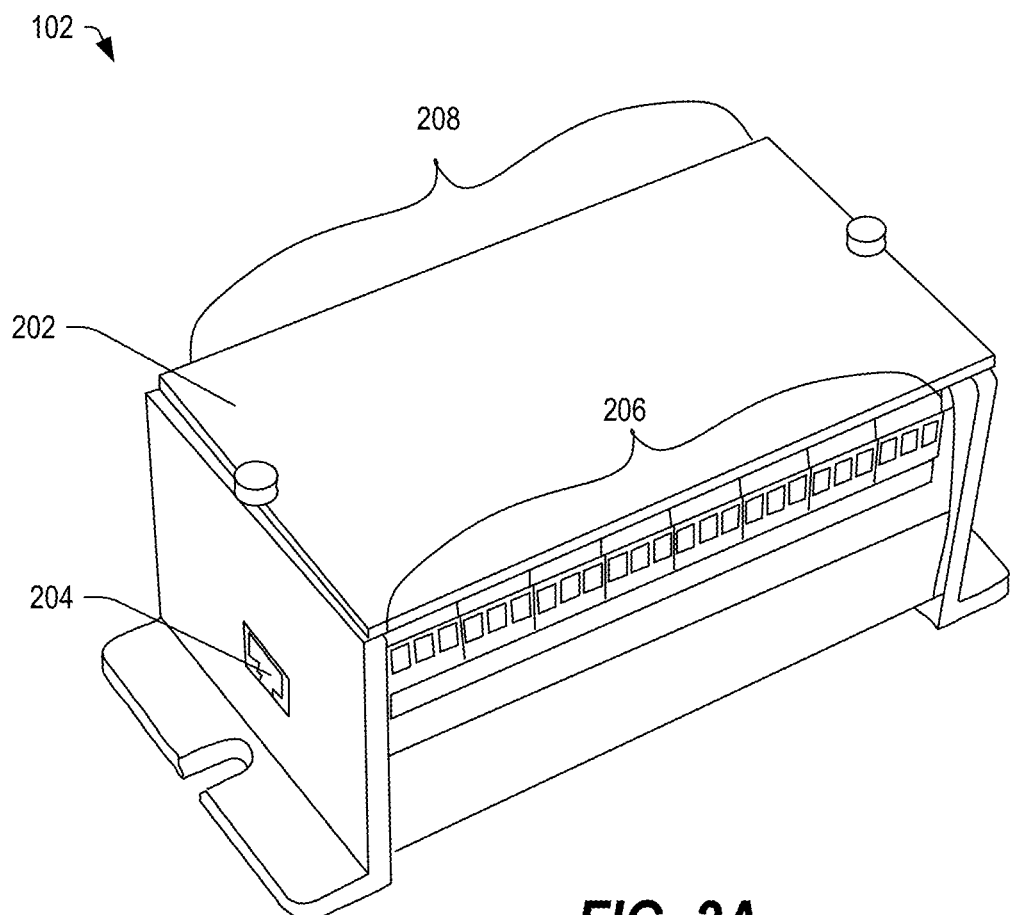
FIG. 2A depicts a perspective view of an edge analytics controller device, in accordance with certain embodiments of the present disclosure.

FIG. 2A depicts a perspective view of an EAC device 102, in accordance with certain embodiments of the present disclosure. The EAC device 102 may include a housing 202 defining an enclosure sized to enclose and secure circuitry. The circuitry may include a memory, a processor, an Ethernet network card, a plurality of input/output (I/O) circuits, power circuitry, other circuits, or any combination thereof. The EAC device 102 can include an Ethernet port 204, a plurality of output ports 206, and a plurality of input ports 208. In some embodiments, each of the ports 206 and 208 may be an input/output (I/O) port, which may be configured during installation. The EAC device 102 may be coupled to various controllers, actuators, sensors, and controllable devices, and may be configured to communicate with other EAC devices 102 or network devices through Ethernet cabling. Other embodiments are also possible.

In certain embodiments, the housing 202 of the EAC device 102 can be small enough to fit within existing structures. In an example, the EAC device 102 may include footings that can be fastened to a surface, such as a wall, a ceiling support structure, or other surface. In some embodiments, the EAC device 102 may be fastened to a structure, such as the wall of a utility closet or within the housing of a larger device.

Figure 2B:
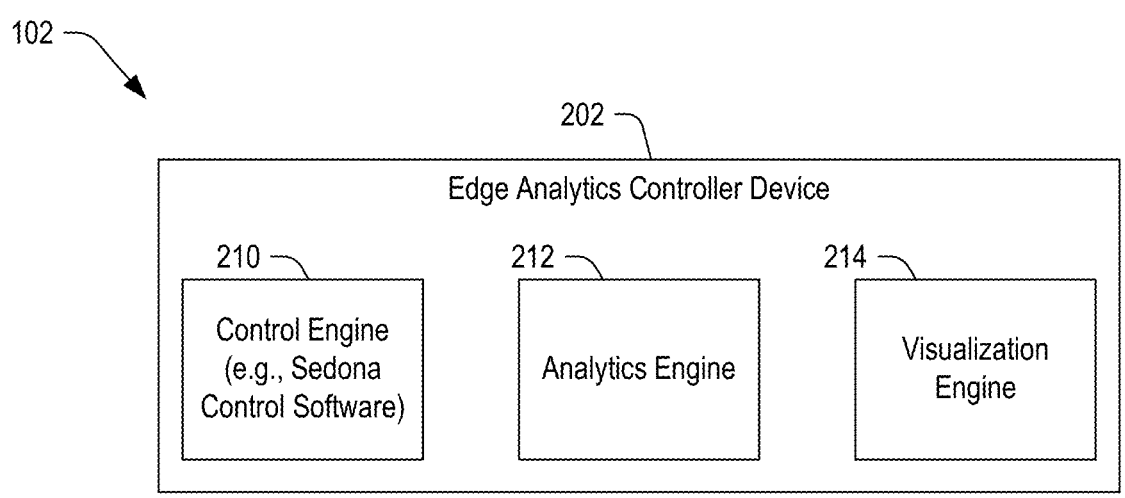
FIG. 2B depicts a block diagram of an edge analytics controller device, in accordance with certain embodiments of the present disclosure.

FIG. 2B depicts a block diagram of an EAC device 102, in accordance with certain embodiments of the present disclosure. The EAC device 102 may be an all-in-one controller device that can include a control engine 210, an analytics engine 212, and a visualization engine 214. The control engine 210 may be implemented using the Sedona Framework, a software environment developed by Tridium Inc., of Richmond, Va. The Sedona Framework is a software environment designed to make it easy to build smart, configurable, embedded devices that can be configured to implement control applications. The Sedona Framework may utilize a programming language that is a component-oriented programming language similar to Java or C#, which programming language may be utilized to configure components. In an example, using an application editor, components may be drag-and-dropped onto a configuration panel within a software application interface.

The analytics engine 212 may be configured to automatically aggregate and organize received data, including real-time and time-series data, as well as historical data. The analytics engine 212 may add "tags" to data items to convey definitions and associations. In some embodiments, the "tags" may be semantic tags. For example, a blower for a ventilation unit maybe associated with a plurality of tags that define its location (site, building, floor, etc.), manufacturer, capacity, schedule, associated control parameters, and so on. Records can have as many tags as needed and new tags can be added ad hoc whenever needed to uniquely identify the devices and their corresponding data streams. Tags provide the hooks that the analytics engine 212 can use to correlate and analyze the data. Further, the analytics engine 212 can historicize (tag) data items within multiple data streams from different devices and can organize the resulting tagged data stream into time-correlated data, which data streams may be combined and analyzed to identify patterns in the data. Rules or adjustments may be established and applied by the EAC device 102 based on recurrences of such patterns within the data streams.

In some embodiments, the EAC device 102 may historicize data from one ore more devices to form data streams. The EAC device 102 may apply filters to streams and combine the streams (synchronized in time) into a single stream, which may be referred to as a pattern. The pattern may include data streams associated with a plurality of devices. The EAC device 102 may apply rules to control one or more devices based on a determined pattern within the data streams. In some embodiments, the pattern may be used to determine the mode in the EAC engine, which can write back to the real-time control engine.

In some embodiments, the visualizations module 214 may be included in the EAC device 102 and can be configured to generate one or more visualizations corresponding to the received data. Such visualizations can include dashboard elements, charts, tables, and other groupings of data. In some embodiments, the visualizations module 214 may be configured by an operator to provide selected visualizations of the data streams.

Figure 3:
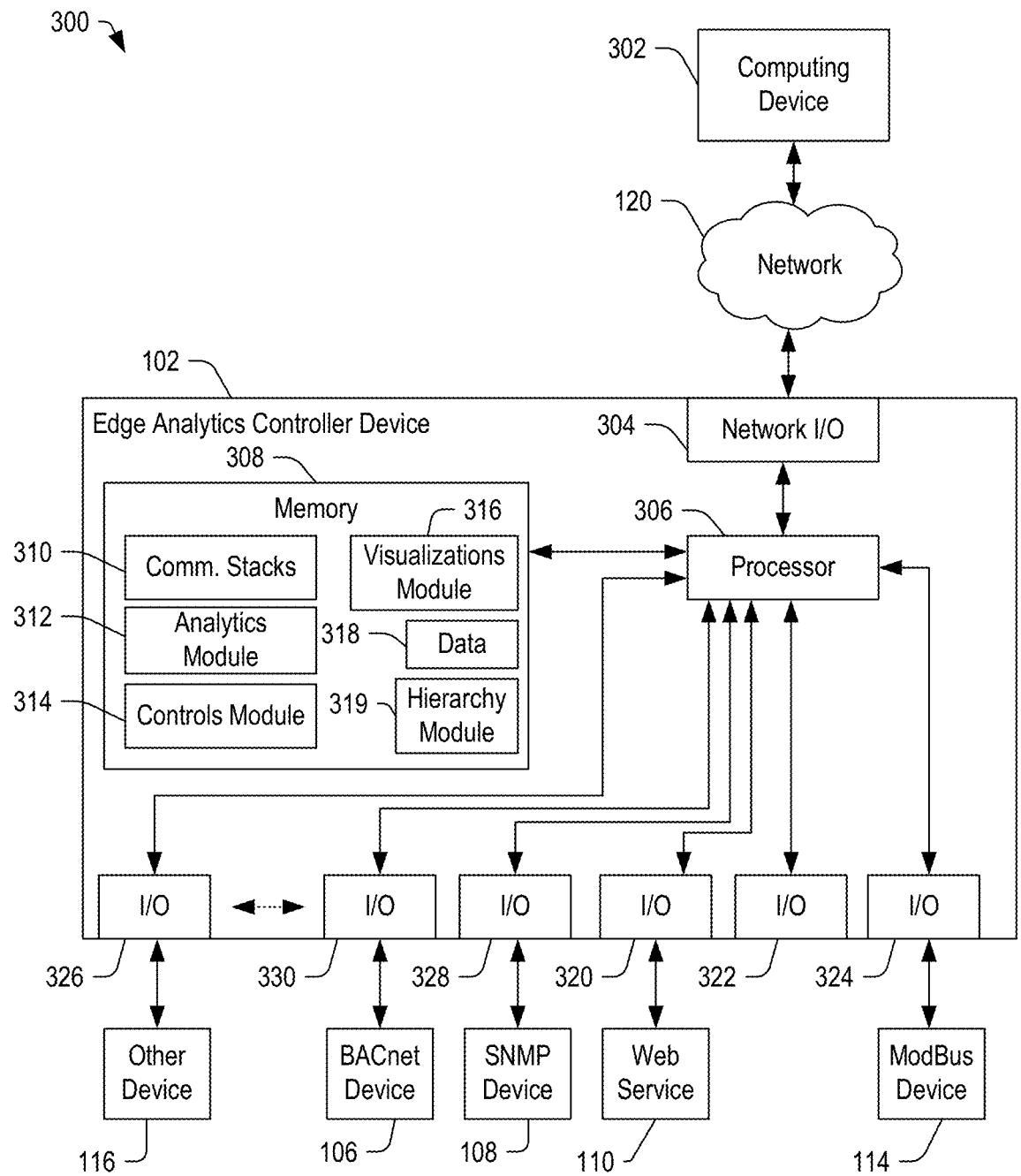
FIG. 3 depicts a block diagram of an edge analytics controller device, in accordance with certain embodiments of the present disclosure.

FIG. 3 depicts a block diagram of a system 300 including an EAC device 102, in accordance with certain embodiments of the present disclosure. The EAC device 102 may communicate with a BACnet device 106, an SNMP device 108, a Web service device 110, a MODbus device 114, other devices 116, or any combination thereof. Further, the EAC device 102 may include a network input/output (I/O) interface 304 configured to communicate with a network 120, and may communicate with a computing device 302 through a network 120. The EAC device 102 may also include a processor 306 coupled to the network I/O 304, to a memory 308, and to a plurality of I/O ports 320, 322, 324, 326, 328, and 330.

The memory 308 may store data and may include instructions that may be executed by the processor 306. In an example, the memory 308 may include communication stacks 310 that, when executed, may cause the processor 306 to control communications with the network I/O 304 and the I/O ports 320, 322, 324, 326, 328, and 330 to send and receive data, commands, instructions, or any combination thereof. The memory 308 may further include an analytics module 312 that, when executed, may cause the processor 306 to receive and apply semantic tags to data received from one or more devices coupled to one or more of the I/O ports 320, 322, 324, 326, 328, and 330. Further, the analytics module 312 may cause the processor 306 to combine and analyze the data streams to determine patterns in the data stream and to determine adjustments for one or more devices based on the determined adjustments.

The memory 308 may also include a controls module 314 that, when executed, may cause the processor 306 to generate control signals in response to receiving, processing, and analyzing the data. In an example, a control signal may include initiating a call to emergency services, such as a fire department, in response to a signal from a smoke alarm or a security system. In another example, the control signal may include device adjustment signals to one or more devices. In some embodiments, the controls module 314 may include a software environment developed by Tridium Inc., of Richmond, Va. called the Sedona Framework. The Sedona Framework is a software environment that was designed to make it easy to build smart, embedded devices for implementing control applications. The programming language of the Sedona Framework is a component-oriented programming language, similar to Java or C#, which allows an operator to develop and assemble custom components into applications. In some embodiments, other software tools or frameworks may be used to script, program, configure, or otherwise customize the control applications.

The memory 308 may further include a visualizations module 316 that, when executed, may cause the processor 306 to generate one or more visualizations based on the data. The visualizations can include dashboards, charts, comparison tables, other visualizations, or any combination thereof. Further, the memory 308 may store at least a portion of the data 318, such as a portion of the data that was tagged and that is to be analyzed by the processor 306 using the analytics module 312. The data 318 may also include historical data as well as data received from other EAC devices 102. Other embodiments are also possible.

Further, the memory 308 may include a hierarchy module 319 that, when executed, may cause the processor 306 to exchange information with one or more other EAC devices 102. The exchanged information can include location data, device data, parameter data, other data, or any combination thereof. Based on such data, the hierarchy module 319 may cause the processor 306 to automatically generate a list of EAC devices 102 and to automatically determine a hierarchy between the various EAC devices 102 (including itself). In certain examples, the hierarchical relationship between the EAC devices 102 may allow one of the EAC devices 102 to provide control instructions to other EAC devices 102. In some embodiments, parameter data may be shared with other EAC devices 102, such that if one EAC device 102 fails, another "higher order" EAC device 102 may either assume control of the failed EAC device 102 or restore its parameters, for example.

In certain embodiments, the EAC device 102 may include a plurality of I/O ports 320, 322, 324, 326, 328, and 330, which may be specific to the particular type of device to which the port may be connected. In some embodiments, the EAC device 102 may include one or more additional ports, including a Universal Serial Bus (USB) port, a Registered-Jack-11 (RJ 11) port, other types of ports, or any combination thereof. In some examples, the I/O ports 320, 322, 324, 326, 328, and 330 may include universal inputs, digital inputs, analog inputs, TRIAC outputs, other inputs, other outputs, or any combination thereof.

The EAC device 102 may be configured to utilize Ethernet connectivity to control building services on an Internet Protocol (IP) backbone. The EAC device 102 may utilize the analytics module 312 to perform analytics processing of large data sets, enabling integration of new workflows at the controller level. For example, the EAC device 102 can be configured to enable detection and diagnosis of faults in equipment, automatically respond to occupant hot/cold calls by adjusting one or more parameters of associated devices, automatically adjust or shift energy loads to participate in demand response programs, automatically perform or adjust other building operations management tasks, or any combination thereof. In some embodiments, the EAC device 102 may be capable of high-speed handling of the work involved in trending data, adding semantic tagging and generating analytics. Further, the EAC device 102 may utilize the analytics module 312 to provide real-time control of coupled devices. Other embodiments are also possible.

Figure 4:
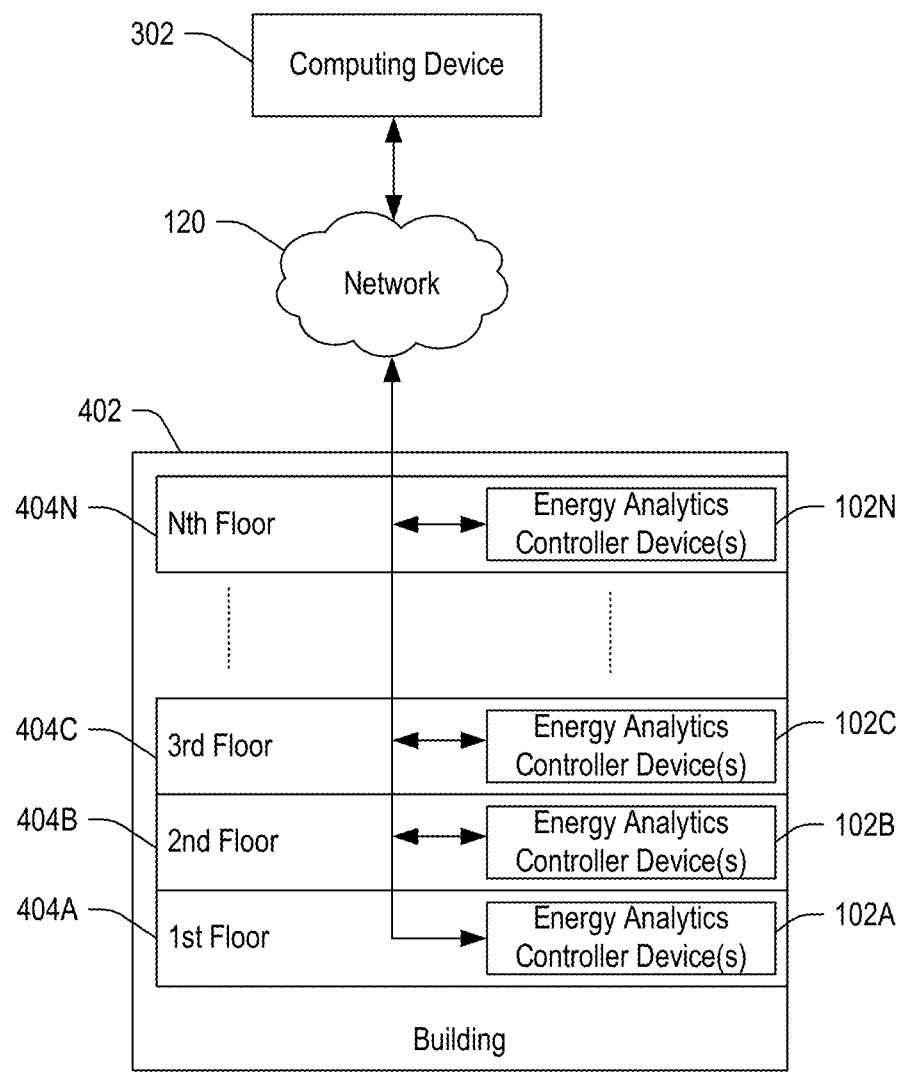
FIG. 4 depicts a block diagram of a system including multiple edge analytics controller devices, in accordance with certain embodiments of the present disclosure.

FIG. 4 depicts a block diagram of a system 400 including multiple EAC devices 102A-102N, in accordance with certain embodiments of the present disclosure. In the illustrated example, the system 400 includes a building 402 having multiple floors 404 (including floors 404A, 404B, 404C, through 404N), each of which has a respective EAC device 102 (including EAC devices 102A, 102B, 102C, through 102N). Each EAC device 102 can be coupled to the Ethernet backbone of the building 402, enabling communication between the EAC devices 102 and enabling communication with a computing device 302 through the network 120. The computing device 302 can include a tablet computer, a laptop computer, a server, a desktop computer, a smart phone, another data processing device, or an combination thereof.

The EAC devices 102 may communicate with one another through the Ethernet backbone of the building and may automatically assemble a list of EAC devices 102, associated devices, and their parameters. Further, in some embodiments, the EAC devices 102 may automatically negotiate and determine a hierarchy between the EAC devices 102. The EAC device 102 that has the lowest number Internet Protocol (IP) address in the list may be a default master, and other EAC devices 102 may be slotted into the hierarchy according to their assigned IP addresses. In other embodiments, the EAC devices 102 may be organized in a hierarchy according to the pre-determined importance of the building system that it controls. For example, power-related systems may be deemed more important than another system, and such "importance" may determine the hierarchy between EAC devices 102. Other embodiments are also possible.

In some embodiments, each EAC device 102 may be configured to communicate with each other EAC device 102 of a particular building 402 via an Ethernet connection. Further, the Ethernet connection enables communication between the EAC devices 102 of the building 402 and those of one or more other buildings through the network 120. An example of such communication is described below with respect to FIG. 5.

Figure 5:
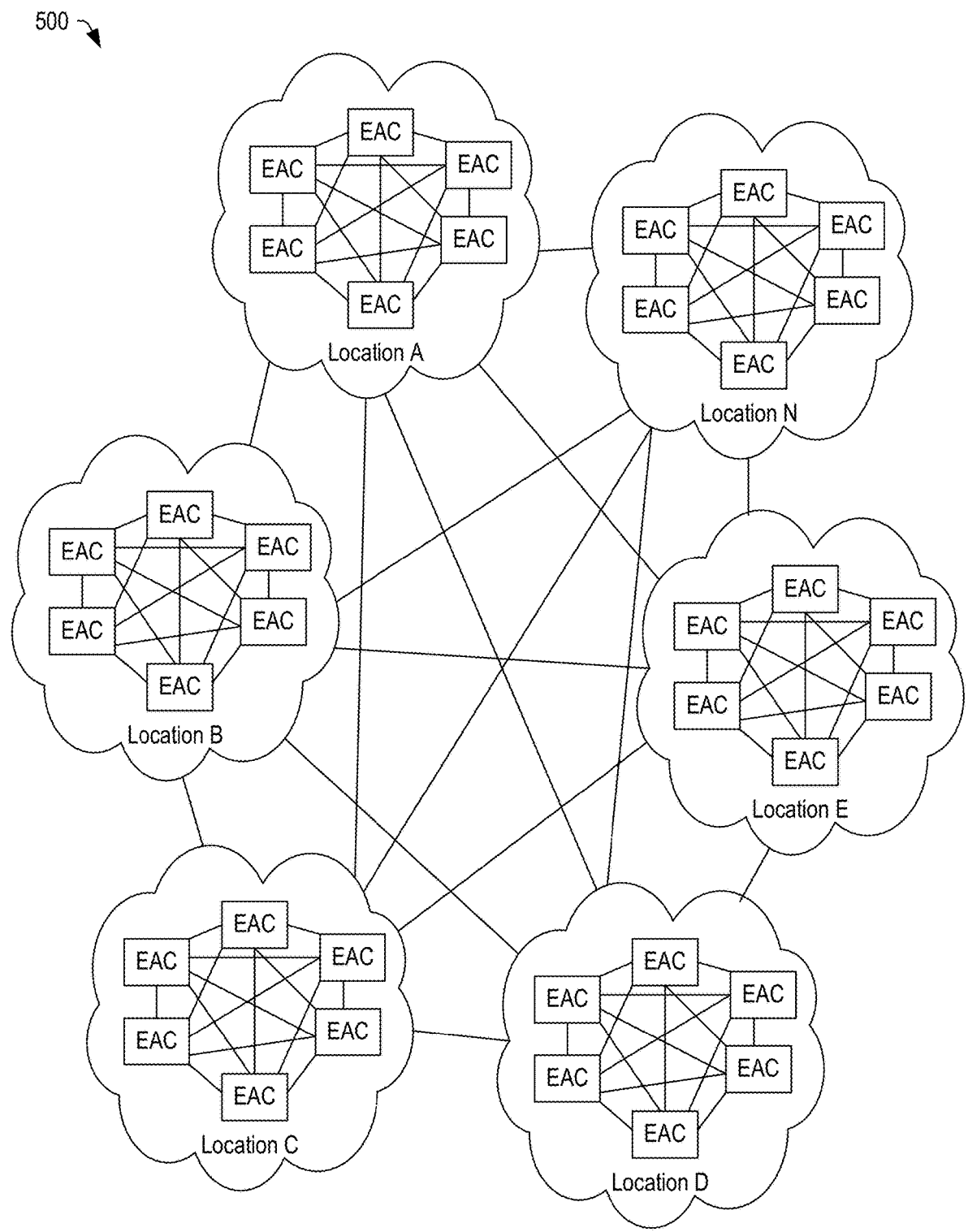
FIG. 5 depicts a block diagram of a system including multiple edge analytics controller devices, in accordance with certain embodiments of the present disclosure.

FIG. 5 depicts a block diagram of a system 500 including multiple EAC devices 102, in accordance with certain embodiments of the present disclosure. The system 500 may include multiple locations (location A-Location N), each of which includes multiple EAC devices 102 that can be communicatively coupled to each other through the Ethernet network switches at their respective location. Further, one or more of the EAC devices 102 at one location may be communicatively coupled to one or more of the EAC devices 102 at another location or at each other location through a wide area network, such as the Internet. By communicatively coupling the EAC devices 102 at a particular location and between locations, the system 500 may provide a network of EAC devices 102 that can share information and analytics to enhance performance.

As discussed above, in some embodiments, the EAC devices 102 may communicate with one another to exchange IP address information, location data, device information, parameters, rules, other information, or any combination thereof. Through this exchange of information, the EAC devices 102 may automatically negotiate a hierarchy of interrelationships within each location and between locations in order to automatically establish a list of EAC devices 102 and their interrelationships.

In a particular example, the EAC device 102 at the location A may be configured to share data from the data stream with one or more EAC devices 102 at location A to distribute processing across multiple EAC devices 102. In another example, a portion of the data stream may be distributed to an EAC device 102 at location B to distribute processing. Other embodiments are also possible.

Figure 6:
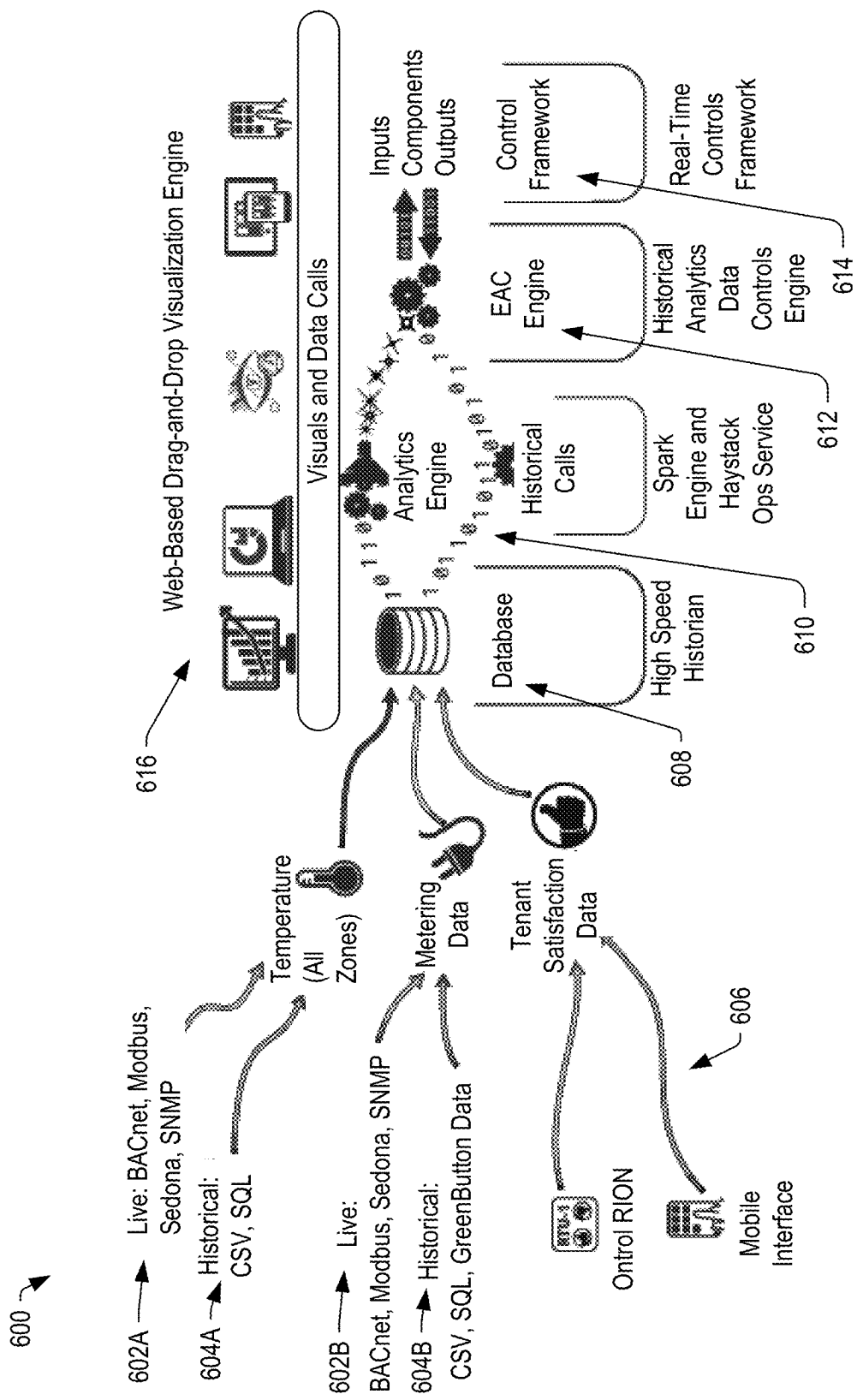
FIG. 6 depicts a block diagram of a system including an edge analytics controller device, in accordance with certain embodiments of the present disclosure.

FIG. 6 depicts a block diagram of a system 600 including an EAC device 612, in accordance with certain embodiments of the present disclosure. The EAC device 612 may include a plurality of inputs, including live inputs, such as inputs 602A (temperature zone data) and 602B (metering data) from BACnet devices, Modbus devices, control software, SNMP devices, or any combination thereof. Further, the EAC device 612 can include a plurality of historical inputs 604A (temperature zone data) and 604B (metering data), such as a comma-separated values (CSV) file, structured query language (SQL) data, Department of Energy "Green Button" data initiative data, other data, or any combination thereof. Further, the system 600 may communicate with Ontrol RION, which is a Sedona Room Controller of the Sedona Framework. In some embodiments, the system 600 may communicate with a mobile interface 606, such as an application running on a mobile device, such as a smart phone or a tablet computer, to provide tenant satisfaction data.

The received data may be tagged and stored in a database 608. The EAC engine 612 (which may be an example of the EAC device 102 in FIGS. 1-5) may make calls to the database 608 and historical calls 610 to retrieve and process the data. Further, the EAC engine 612 may receive "real time" data from various devices, such as digital sensors, actuators, fans, and so on. In certain embodiments, the EAC engine 612 may "historicize" the data. Such data may be true for a period of time, and then it becomes false. For example, a temperature reading may be captured digitally and may remain valid until a next temperature sampling operation is performed. In another example, a fan state may be binary (off or on), and the on state may be true for a period of time and then it becomes "false" when the fan is turned off. The EAC device 612 may convert such data from a digital state into a data stream, may synchronize the data stream to other data streams, and then may combine the multiple data streams to form and identify patterns. Based on identification of a particular pattern, the EAC engine 612 may execute a particular rule to send control signals and other data to a control framework 614, which may include HVAC system components, lighting system components, and so on. Further, the EAC engine 612 may provide the processed data to a drag-and-drop visualizations engine 616, which may generate visualizations based on the data and provide the visualizations to one or more web-based applications.

In certain embodiments, the EAC engine 612 may be configured by an operator to import data, which can provide information about interlinked processes as well as historical information. Additionally, the EAC engine 612 can analyze data streams to apply semantic tags to data items within the data stream. The EAC engine 102 may combine multiple data streams to form patterns and may further process the tagged and combined data streams to determine patterns within the data stream. Further, the EAC engine 612 may be configured to enforce machine rules that can report run-time and occupant comfort issues, for example, based on determined patterns, based on inputs from an operator, or any combination thereof. Further, the EAC engine 612 may receive tenant satisfaction information from a web user interface or installed touch-screen device. Further, the EAC engine 612 can apply control logic (configured by the operator) to process and apply web-based tags to the processed data, where the processed data may be reviewed through visualizations including real-time and historical data using web-based interfaces, such as Hyper Text Markup Language (HTML5) dashboards, which can permit easy block programming with tags. The system 600 may use the tagged data to generate visualizations and analytics based on the resulting control logic.

In the illustrated example, the data flows in the system 600 from inputs into a database 608 for storage and for live and historical data retrieval. In some embodiments, "Project-Haystack" semantic tagging and data modeling can be utilized as a standard naming taxonomy. Project Haystack is an open source initiative to streamline working with data from the Internet of Things (IOT), which standardizes semantic data models and web services to capture and process data generated by smart devices. The Project Haystack initiative is an initiative that is coordinated by a 501C tax-exempt corporation named Project Haystack and organized in the state of Virginia. Alternatively, proprietary tagging and data modeling can be used to provide a naming taxonomy. The EAC engine 612 can process live data and historical data to optimize runtime within the networked devices. Further, an object-based programming interface may be used for block programming of the user interface, making it easy to interrogate the database 608 and to generate visualizations. In certain embodiments, the visualizations may present live and historical data as well as results generated by the EAC engine 612. In an example, the EAC engine 612 may apply semantic tags to received data, synchronize the tagged data to other data streams, and identify patterns within combined data streams. The EAC engine 612 may determine adjustments, analytics visualizations, alerts, and other signals and may communicate with one or more devices, a control system, other EAC devices, or any combination thereof based on the determined information.

In an example, the system 600 may provide an interface through which an operator may log in to the system 600 to access and configure both the control logic and the visualizations. In an example, the various components of the system 600 may be provided as drag-and-drop visual objects within the interface. As used herein, the phrase "drag-and-drop" may refer to an operation by which a user may position a pointer of a pointer, stylus, or mouse over an element, push a button to select the element, and, before releasing the button, move the pointer to another location on the interface and then release the button to drop the element at the location. An operator may drag-and-drop an element from a palette onto a configuration panel, may drag and drop elements within the configuration panel to rearrange the elements, or any combination thereof. The operator may then select and interact with an element within the configuration interface to configure the parameters of the selected element and to link the element to one or more other elements. A representative example of such an interface is described below with respect to FIG. 7.

Figure 7:
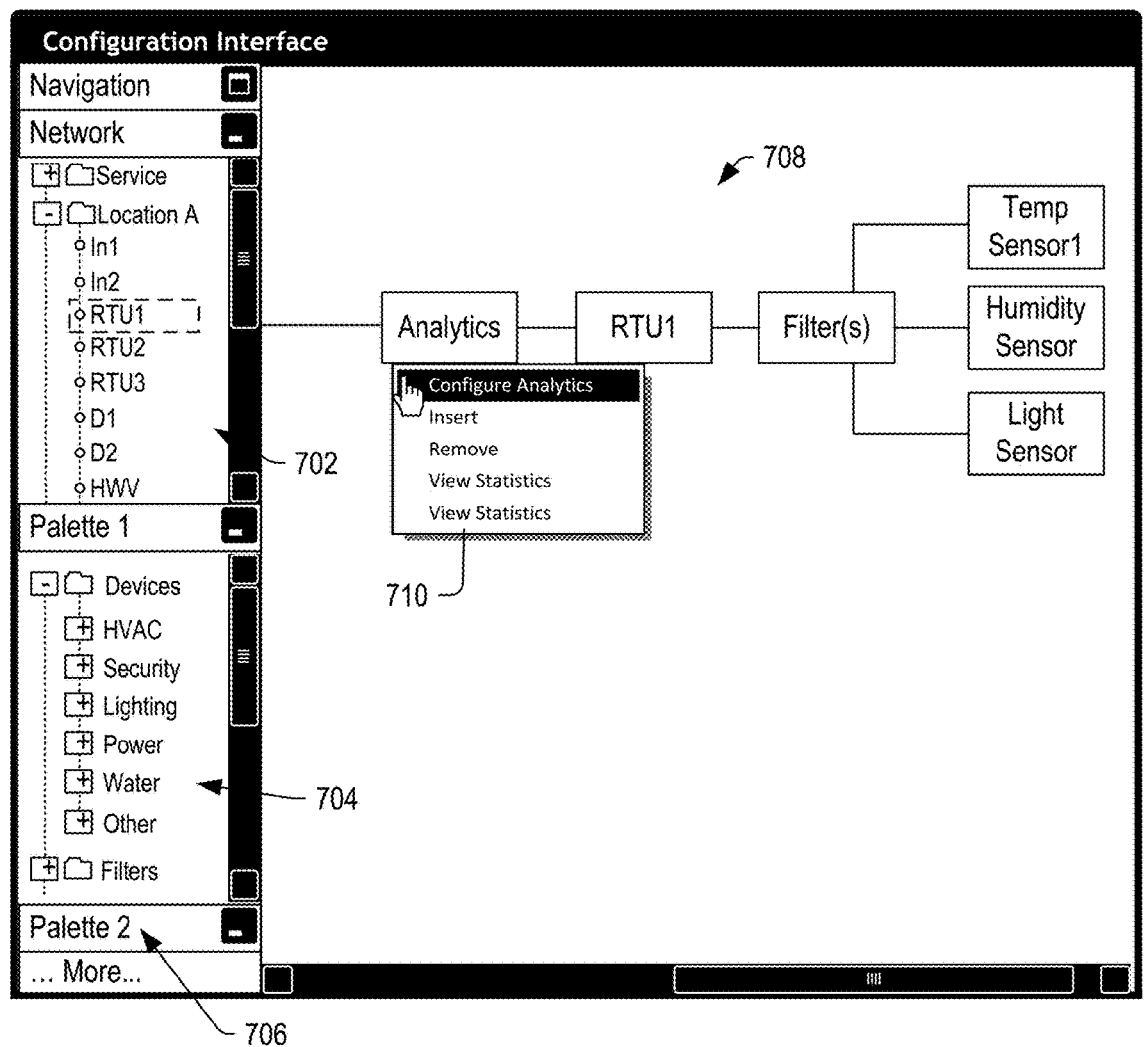
FIG. 7 depicts a representative example of a drag-and-drop interface for configuring an edge analytics controller device, in accordance with certain embodiments of the present disclosure.

FIG. 7 depicts a representative example of a drag-and-drop interface 700 for configuring an edge analytics controller device, in accordance with certain embodiments of the present disclosure. The drag-and-drop interface 700 may include a navigation panel 702, which may include a plurality of locations and a plurality of configurable components at each location. The configurable components may include relays, sensors, actuators, drivers, systems, and other components, which may represent physical devices associated with a building automation system and which may be selected and dropped onto a configuration panel 708. The drag-and-drop interface 700 may further include a palette panel 704 that may be accessed to drag-and-drop further features onto the configuration panel 708. Such features may include specific devices, which may be organized by type, by manufacturer, by another parameter, or any combination thereof. Such features may also include a variety of configuration modules, such as a user interface module, filters, analytics modules, other modules, or any combination thereof. In some embodiments, one or more additional panels 706 may be included, which can include protocols, functions, and features accessible by dragging and dropping selected components onto the configuration panel 708. Such panels may 702, 704, and 706 may be expanded and collapsed by interacting with the interface 700.

In the illustrated example, a particular roof top unit at location A is selected and, by positioning a pointer over a particular element within the configuration panel 708, the interface 700 may present a popup menu 710 through which an operator may access one or more configuration options. In certain examples, the menu options may include "Configure Analytics", "Insert", "Remove", and "Other". Selection of the "Configure Analytics" option from the popup menu 710 may cause the interface 700 to provide a window through which an operator may configure parameters, logic, inputs, outputs, and other features of a selected element. Other embodiments are also possible In some examples, an operator may interact with the interface 700 to drag and drop an "actuator" element onto the configuration panel 708. Further, the operator may drag and drop various logical operations, such as AND, OR, XOR, NOT, COMPARE, and other logical operations, onto the configuration panel 708, connecting inputs and outputs to provide various relationships. Additionally, the operator may drag and drop a custom configurable logic block onto the configuration panel 708 and may insert code to provide customize logical operations. Further, the operator may interact with the interface 700 to drag and drop a dashboard element onto the configuration panel 708 and connect it to one of the other elements (such as by tracing a line between elements on the interface using a mouse, stylus, or pointer) to make the data available for use with one or more visualizations.

In some embodiments, the EAC devices 102 may communicate with one another to determine the location, type, devices, and other parameters of each of the communicatively coupled EAC devices 102. During this communication process, the EAC devices 102 may also automatically determine a hierarchy between the EAC devices 102 and their respective devices or systems and between the various EAC devices. This hierarchy information may cause the EAC device 102 to pre-populate the drag and drop interface to enable an operator to visualize and optionally access the network of devices. It should be appreciated that password or other authenticated access may be needed to enable an operator to access data, parameters, and optionally to make configuration changes.

Figure 8:
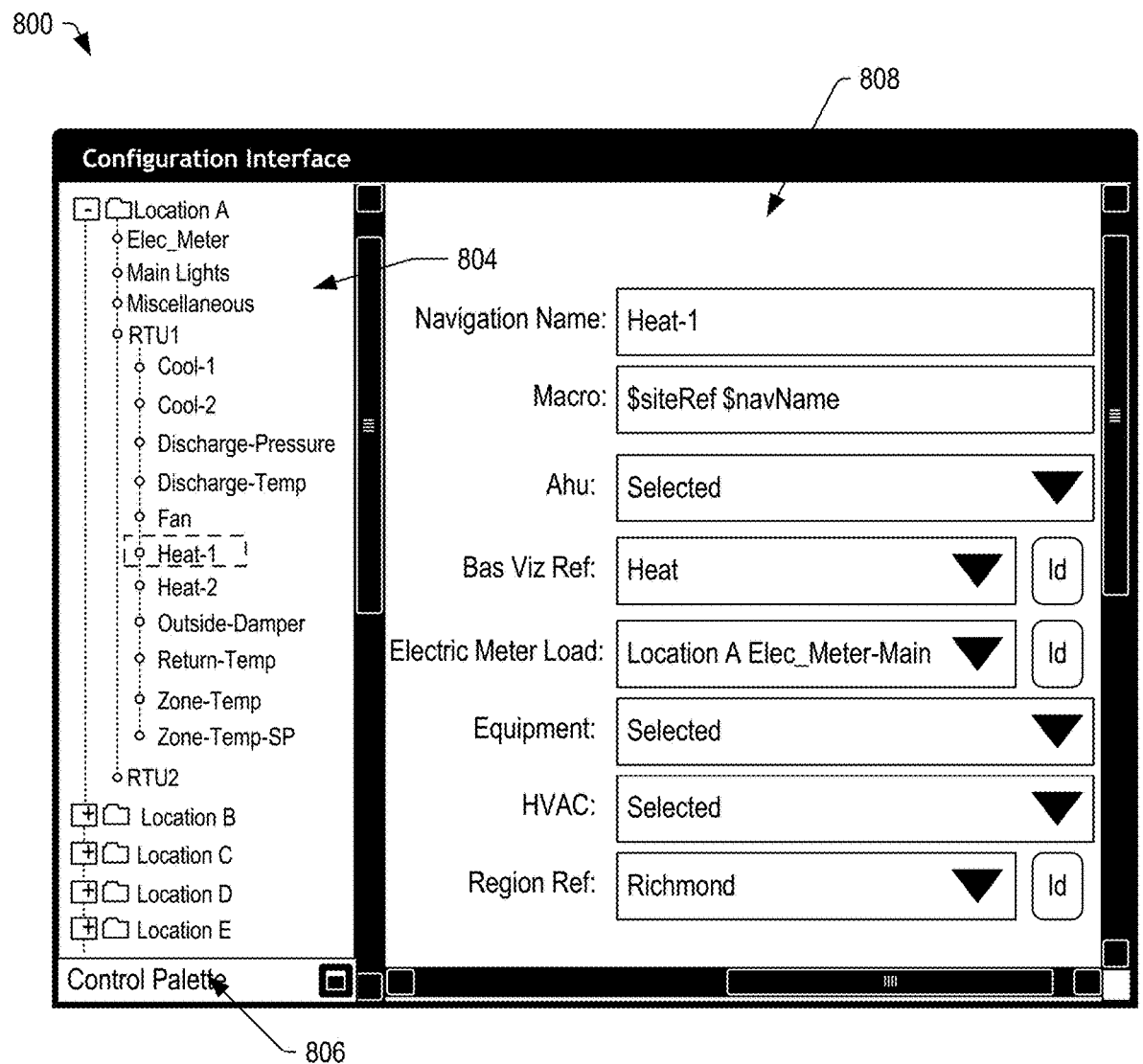
FIG. 8 depicts a representative example of an interface for configuring a system including an edge analytics controller device, in accordance with certain embodiments of the present disclosure.

FIG. 8 depicts a representative example of an interface 800 for configuring a system including an edge analytics controller device, in accordance with certain embodiments of the present disclosure. The interface 800 may include a navigation panel 804 including a plurality of locations (e.g., Location A, Location B, etc.) and a plurality of corresponding elements. Some of the elements may include an electric meter, lights, miscellaneous systems, a roof top unit, and so on. An operator may interact with one of the elements in a tree list by moving a pointer over an element within the tree list and selecting the element. In the illustrated example, a first heating unit (labeled "Heat-1" is selected. The navigation panel 804 may also include a control palette 806 including one or more selectable control elements. The control palette 806 is depicted in a collapsed mode.

The interface 800 may further include a configuration panel 808, which may be accessed by an operator to configure various parameters of the selected element (i.e., "Heat-1"). By interacting with the configuration panel 808, an operator may associate equipment with a particular site or location and may configure various logic operations. It should be appreciated that a number of configurable elements may be accessed by scrolling down using the scroller bar. Further, the configuration panel 808 may be accessed to associate a selected device with a particular location (i.e., "Location A Elec_Meter-Main"). In this example, an operator may associate a device with a macro that defines certain operations. The operator may also access the interface 800 to select a visualization for the particular device, and so on. Once the configurable elements are configured by the operator, the operator may select a "Save" button to store the configuration parameters or select a "Cancel" button to restore the configurable elements to their previous state.

In certain embodiments, the content of the configuration panel 808 may vary based on which of the devices is selected from the navigation panel 804. Further, the configuration panel 808 is depicted as including text fields, buttons, and pull-down menus. However, other types of selectable elements may be used, including radio buttons, tabs, checkboxes, radio buttons, clickable links, other elements, or any combination thereof.

In some embodiments, one or more rules may be added via the configuration panel 808. The rules may include one or more pre-configured rules as well as custom-coded instruction sets. In a particular example, selection of an element on the configuration panel 808 may cause the interface 800 to present a window (popup or other window) within which an operator may write and debug control scripts. In another particular example, selection of an element on the configuration panel 808 may cause the interface 800 to present a popup window from which the operator may select a file for upload, which file may include a script or other set of instructions for execution by the selected device. Other embodiments are also possible.

Figure 9:
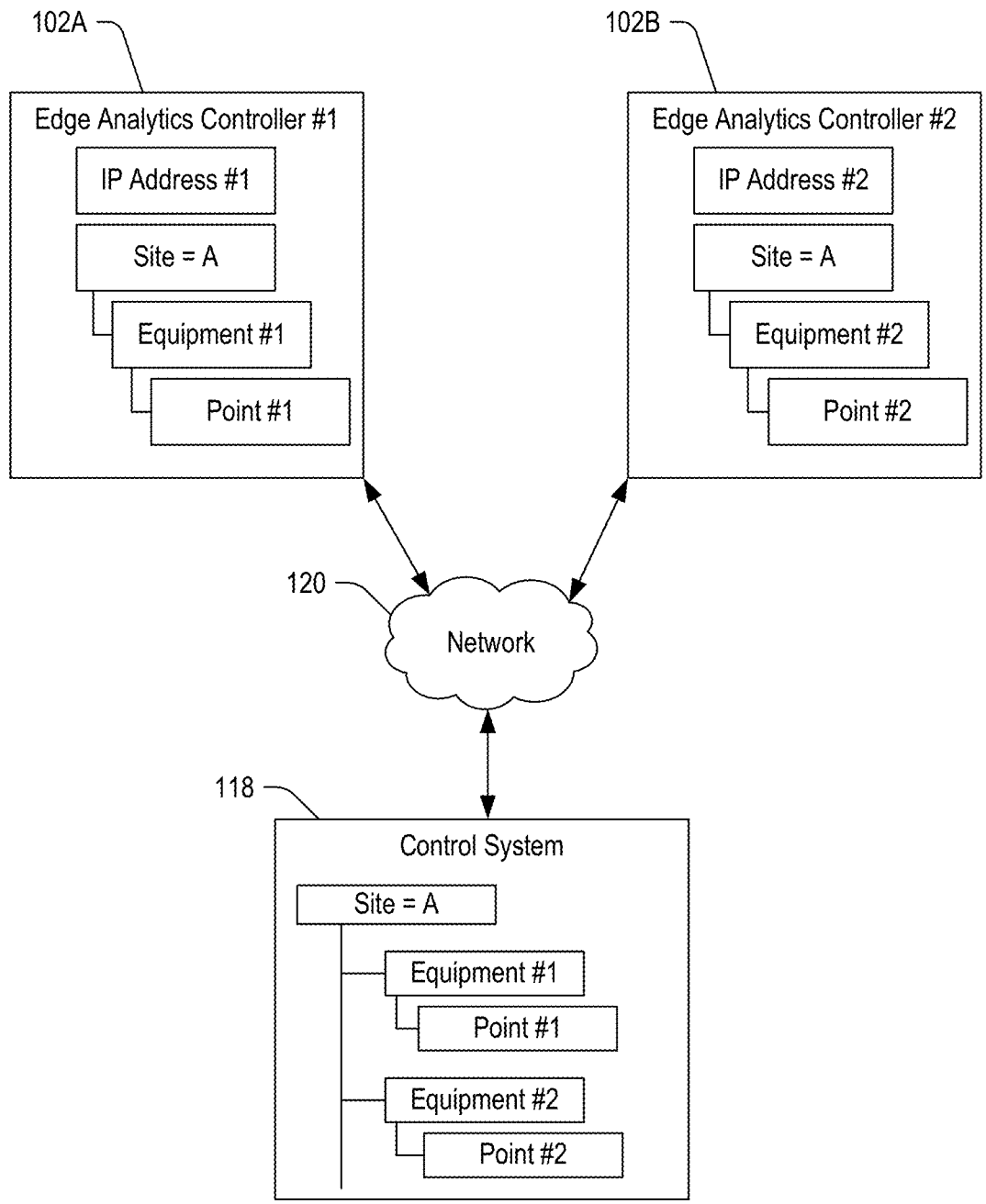
FIG. 9 illustrates a block diagram of a system including edge analytics control devices, in accordance with certain embodiments of the present disclosure.

FIG. 9 illustrates a block diagram of a system 900 including edge analytics control devices 102A and 102B, in accordance with certain embodiments of the present disclosure. The edge analytics control devices 102A and 102B may communicate with one another and with a control system 118 through a network 120. In some embodiments, EAC device 102A may have a first Internet Protocol (IP) address, and EAC device 102B may have a second IP address. The first IP address may be shared with the EAC device 102B, and the second IP address may be shared with the EAC device 102A. Further, each EAC device 102 includes a location indicator as well as information about associated equipment and devices (e.g., points). The information may be provided to a control system 118, which may store information including the equipment and associated devices. Other embodiments are also possible.

In some embodiments, the control system 118 may automatically assemble control information by communicating with the one or more EAC devices 102 through the network 120. The EAC devices 120 may communicate using IP protocols to interrogate one or more of the EAC devices 120 to determine location data, equipment data, device data, and so on. Once that information is known, the control system 118 can automatically determine the building automation system elements and to automatically configure a control network. Subsequently, an operator may interact with drag-and-drop interfaces to refine the automatic configuration, to configure filters, and so on.

Figure 10:
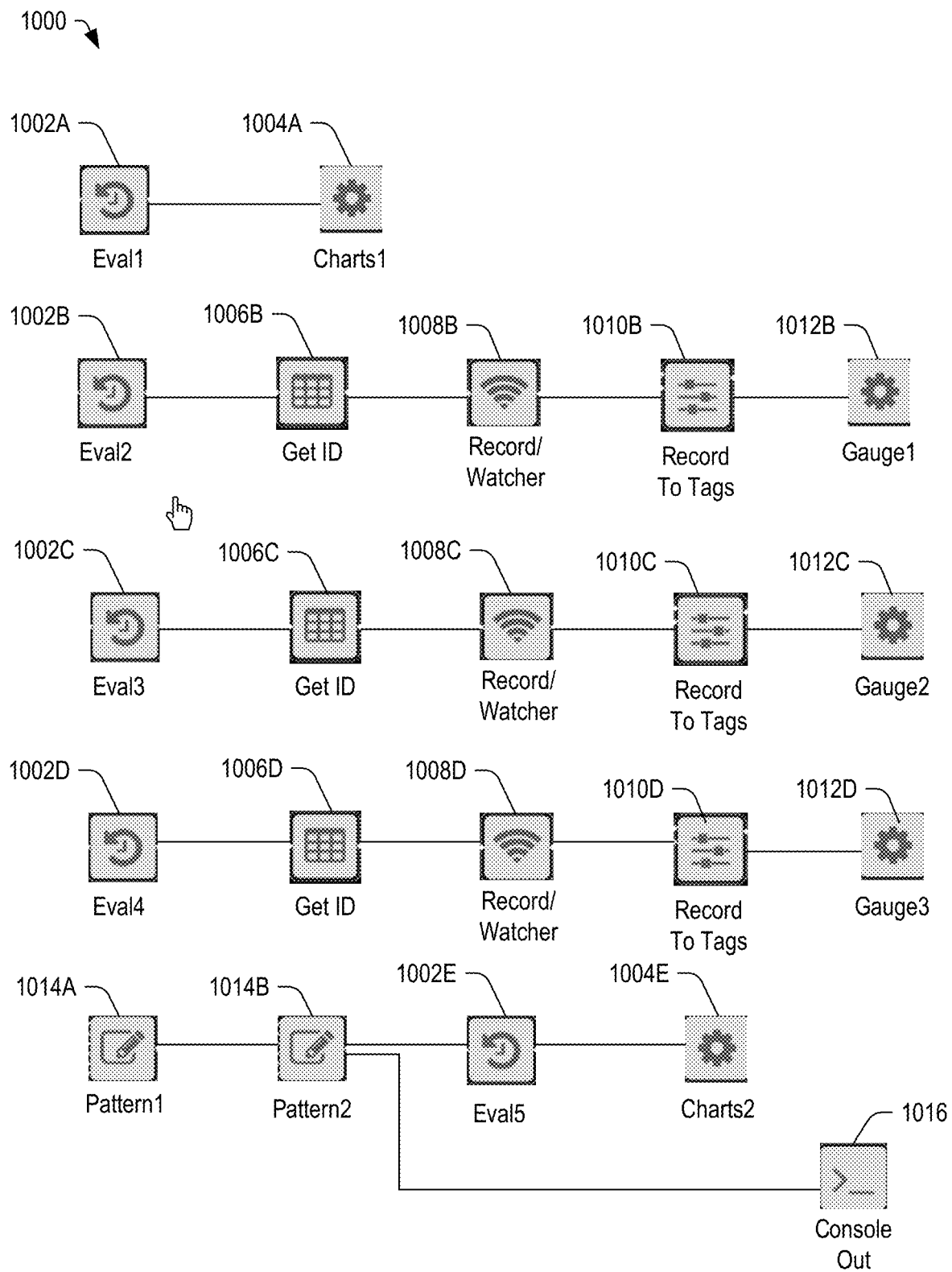
FIG. 10 depicts a representative example of a drag-and-drop interface for configuring one or more edge analytics controller devices, in accordance with certain embodiments of the present disclosure.

FIG. 10 depicts a representative example of a drag-and-drop interface 1000 for configuring one or more edge analytics controller devices, in accordance with certain embodiments of the present disclosure. The drag-and-drop interface 1000 includes evaluation modules 1002, chart modules 1004, get identifier modules 1006, record/watcher modules 1008, record to tags modules 1010, gauges 1012, pattern modules 1014, and console outputs 1016. Other modules (elements) are also possible.

In certain embodiments, an operator may drag and drop selected modules (elements) onto a configuration panel of the graphical interface 1000 and trace connections between the selected modules to configure relationships. Further, an operator may configure parameters of each module to define control logic and functionality. In an example, the operator has connected an evaluation module 1002A to a charts module 1004A, configuring the EAC device to generate chart data based on received data. The console outputs 1016 may provide data for one or more dashboard visualizations, such as meters, digital values, graphs, bar charts, pie charts, other elements, or any combination thereof. The graphical user interface 800 may receive data from the EAC device through the dashboard element added within the drag-and-drop interfaces.

The configuration panel also includes a gauge 1012B coupled to a record to tags module 1010B, which is coupled to a record/watcher module 1008B. The record/watcher module 1008B is coupled to a get ID (identifier) module 1006B, which is coupled to an evaluation module 1002B. The configuration panel also includes a gauge 1012C coupled to a record to tags module 1010C, which is coupled to a record/watcher module 1008C. The record/watcher module 1008C is coupled to a get ID (identifier) module 1006C, which is coupled to an evaluation module 1002C. The configuration panel also includes a gauge 1012D coupled to a record to tags module 1010D, which is coupled to a record/watcher module 1008D. The record/watcher module 1008D is coupled to a get ID (identifier) module 1006D, which is coupled to an evaluation module 1002D.

In some examples, the gauge 1012 may capture data corresponding to a sensor, an actuator, or another device. The data may be provided to the report to tags module 1010, which may apply tags to the data to normalize the data to a standard taxonomy. The record/watcher module 1008 may store the data in a database. The get ID module 1006 may retrieve the data from the database and optionally associate the data with a particular identifier before presenting the data to the evaluation module 1002, which may process the data as discussed above.

In the configuration panel, the evaluation module 1002E is coupled to a charts module 1004E and to a pattern module 1014B, which is coupled to a second pattern module 1014A. The pattern module 1014B is also coupled to a console output 1016. In an example, the pattern modules 1014 may be configurable to combine data streams (real-time, near real-time, historical, or any combination thereof) and to provide custom logic, including pattern detection analysis logic. In a particular example, the pattern module 1014 may be configured to detect an anomaly within a subset of the raw data, which may represent a particular event or issue. An operator may provide custom code or may configure one or more thresholds associated with the pattern module 1014 to process the data for particular events. Other embodiments are also possible.

Figure 11:
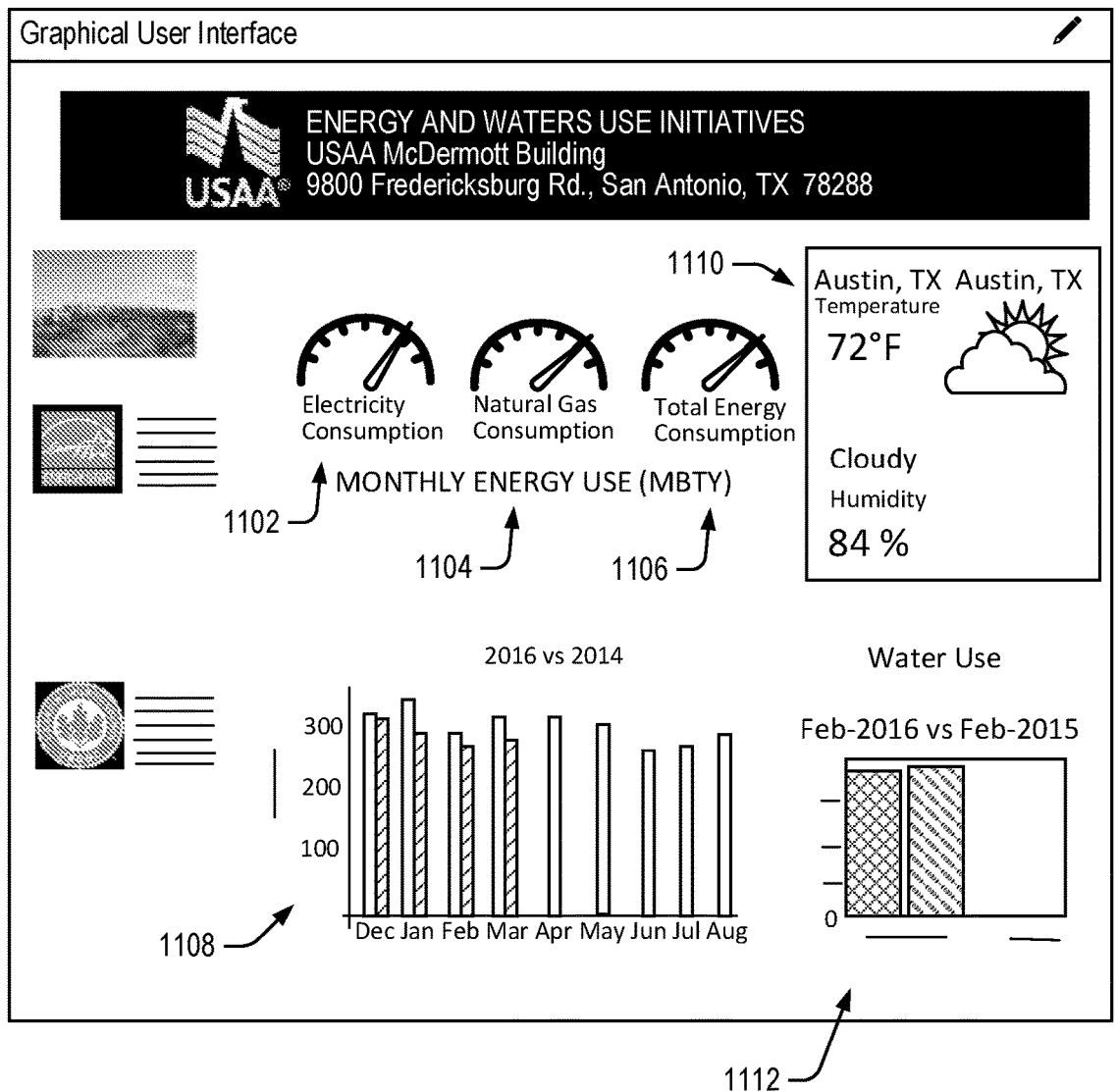
FIG. 11 depicts a graphical user interface for reviewing data from an edge analytics controller device, in accordance with certain embodiments of the present disclosure.

FIG. 11 depicts a graphical user interface 1100 for reviewing data from an edge analytics controller device, in accordance with certain embodiments of the present disclosure. In the illustrated example, the graphical user interface 1100 may include a plurality of dashboard visualizations, including an electric consumption visualization 1102, a natural gas consumption visualization 1104, and a total energy visualization 1106. Further, the graphical user interface 1100 may include an energy consumption chart 1108 that includes current versus historical data. Additionally, the graphical user interface 1100 may include an environmental dashboard 1110 showing current ambient conditions and a water usage visualization 1112 showing water consumption for the building.

It should be understood that the graphical user interface 1100 represents an illustrative, non-limiting example based on a particular configuration of the interface. Since the graphical user interface 1100 may be configured by the operator, other data visualization types (e.g., line graphs, digital meters, and so on) may be used to present the same information. In other examples, other data may be presented using the same or different visualizations. For example, an operator may access the graphical user interface 1100 to view the operating state of specific components of the building's system framework. Alternatively, rather than viewing the overall energy consumption data, the operator may use the graphical user interface 1100 to view energy consumption data of a particular component, including historical data. Other embodiments are also possible.

Figure 12:
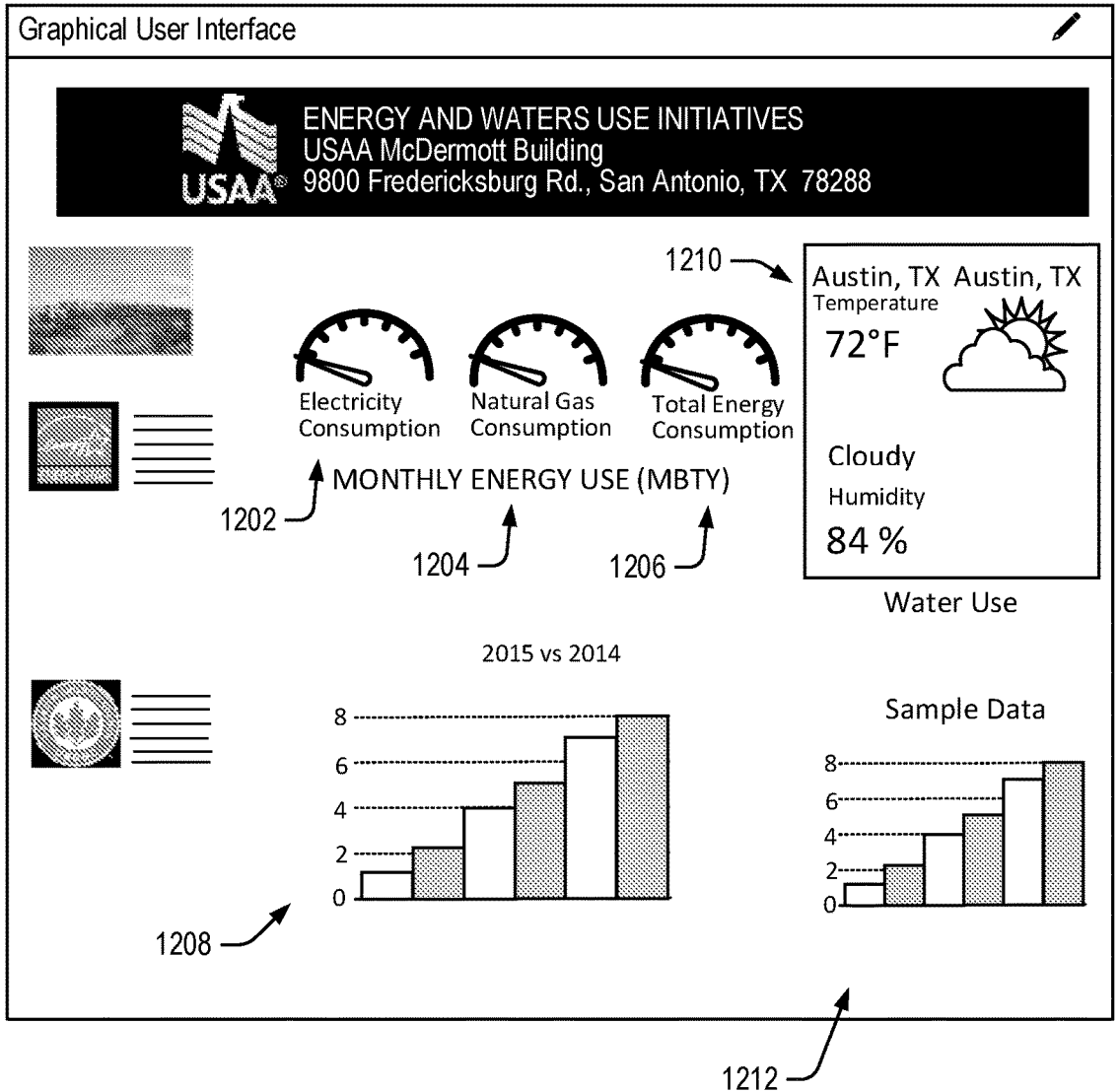
FIG. 12 depicts a graphical user interface including a dashboard showing data from at least one an edge analytics controller device, in accordance with certain embodiments of the present disclosure.

FIG. 12 depicts a graphical user interface 1200 including a dashboard showing data from at least one an edge analytics controller device, in accordance with certain embodiments of the present disclosure. The graphical user interface 1200 may include a plurality of dashboard visualizations, including an electric consumption visualization 1202, a natural gas consumption visualization 1204, and a total energy visualization 1206. Further, the graphical user interface 1200 may include an energy consumption chart 1208 that includes current versus historical data. Additionally, the graphical user interface 1200 may include an environmental dashboard 1210 showing current ambient conditions and a water usage visualization 1212 showing water consumption for the building. Other data may be presented and other visualizations of the data may be selected to allow an operator to evaluate the system's operation.

Figure 13:
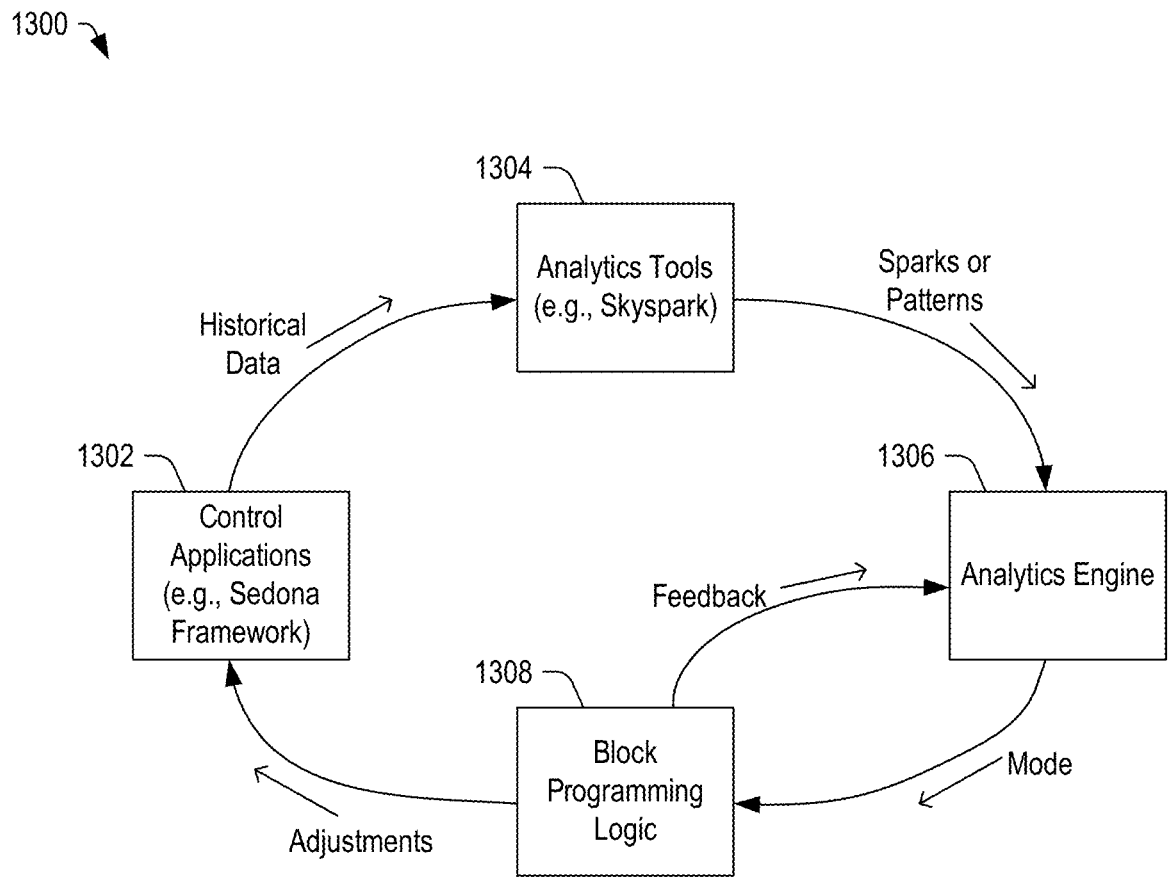
FIG. 13 illustrates a block diagram of an edge analytics control device, in accordance with certain embodiments of the present disclosure.

FIG. 13 illustrates a block diagram of an edge analytics control device 1300, in accordance with certain embodiments of the present disclosure. The EAC device 1300 may be an example of embodiments discussed above with respect to FIGS. 1-12. The EAC device 1300 may include control applications 1302, such as the Sedona Control Framework applications, analytics tools 1304, an analytics engine 1306, and block programming logic 1308. The control applications 1302 may communicate historical data to analytics tools 1304, such as SkySpark by SkyFoundry of Glen Allen, Va. The historical data may include "real time" or near "real time" data that has been historicized by applying semantic tags and by converting data points into data streams that can be synchronized to other data streams to form patterns that can be processed and analyzed.

The analytics tools 1304 may identify sparks or patterns in the combined data streams and may communicate information related to such identification to the analytics engine 1306. The analytics engine 1306 may determine a mode based on the identification. The mode may include information about a particular pattern as well as pre-defined rules for responding to detection of the pattern. The analytics engine 1306 may communicate information about the mode to block programming logic 1308, which may determine adjustments, changes, rules, or other information based on the mode. The determined information may be fed back to the analytics engine 1306 and may be communicated as adjustment information to the control applications 1302.

In some embodiments, the control applications 1302 may historicize the data to form data streams. The analytics tools 1304 may apply filters to streams and combine the streams (synchronized in time) into a single stream that is called a pattern. The analytics engine 1306 may use the pattern to determine the mode in the EAC engine. The mode may be provided to the block programming 1308, which can write back to the real-time control applications 1302.

The block programming logic 1308 may be implemented through drag-and-drop interfaces by dragging selected elements or filters onto the configuration panel and by selectively configuring one or more of the elements to achieve a selected logic function. In some embodiments, the logic operations may alter operation of one or more devices within a building, for example.

In some embodiments, the EAC devices 102 may communicate with one another to determine the location, type, devices, and other parameters of each of the communicatively coupled EAC devices 102. During this communication process, the EAC devices 102 may also automatically determine a hierarchy between the EAC devices 102 and their respective devices or systems and between the various EAC devices. This hierarchy information may cause the EAC device 102 to pre-populate the drag and drop interface to enable an operator to visualize and optionally access the network of devices. It should be appreciated that password or other authenticated access may be needed to enable an operator to access data, parameters, and optionally to make configuration changes.

In conjunction with the systems, methods and devices described above with respect to FIGS. 1-13, an edge analytics controller device is disclosed that includes a plurality of input/output ports. The edge analytics controller further includes a processor coupled to the ports, a memory coupled to the processor, and a network transceiver coupled to the processor. In an example, the edge analytics controller may be configured using an object-based programming interface to provide desired monitoring and control of building systems. The edge analytics controller may be coupled to a number of terminal devices on a floor of a building, such as thermostats, optical sensors, lighting units, fans, water monitoring units, humidity sensors, other devices, or any combination thereof. The edge analytics controller may be configured to receive data from the devices, tag the data, store the data, and analyze the data. In some embodiments, the edge analytics controller may be configured to automatically determine adjustments, control signals, and the like in response to determining patterns in the data.

In some embodiments, the edge analytics controller may send at least a portion of the data to another device via a network connection. Further the edge analytics controller may communicate with other edge analytics controllers to exchange identifier data, location data, device data, parameters, and so on. In some embodiments, the edge analytics controllers may automatically determine a hierarchy between each edge analytics controller and its associated devices and between edge analytics controller devices. Other embodiments are also possible.

Although the present invention has been described with reference to preferred embodiments, workers skilled in the art will recognize that changes may be made in form and detail without departing from the scope of the invention.

What is claimed is:

1. A system comprises:
  a plurality of controllers, each controller comprises:
  a network interface configured to couple to a network;
  a plurality of input/output (I/O) ports configured to couple to a plurality of devices;
  a processor coupled to the network interface and to the plurality of I/O ports; and
  a memory accessible to the processor and storing instructions that cause the processor to:
    receive data from one or more of the plurality of I/O ports, the data from each I/O port associated with a respective device of the plurality of devices;
    automatically apply semantic tags to the data to produce tagged data, the semantic tags defining a device identifier and a location, and including at least one of a manufacturer of the respective device, a schedule associated with the respective device, and a control parameter associated with the respective device;
    determine a pattern based on the tagged data;
    determine an anomaly within the tagged data based on the pattern, the determined anomaly indicative of a particular issue;

selectively adjust one or more parameters of selected ones of the plurality of devices to manage one or more of a plurality of building operations management tasks based on the determined anomaly;

communicate parameter data from one or more of the plurality of controllers to a second controller of the plurality of controllers; and in response to a failure of a first controller of the plurality of controllers, receive the parameter data from the second controller to restore operation of the first controller.

2. The system of claim 1, wherein the instructions cause the processor to:

communicate data including location, network address, device, and parameter information to other controllers of the plurality of controllers through the network;

receive data including location, network address, device, and parameter information from the one or more other controllers through the network; and automatically determine a hierarchy between the controller and each of the one or more other controllers of the plurality of controllers.

3. The system of claim 1, wherein the instructions cause the processor to diagnose a fault in a piece of equipment based on the determined anomaly.

4. The system of claim 1, wherein the instructions cause the processor to:

receive input data corresponding to an occupant call;

determine at least one device corresponding to the input data of the occupant call; and automatically generate a control signal to the at least one device in response to receiving the input data of the occupant call.

5. The system of claim 1, wherein the instructions cause the processor to:

determine energy demand across the plurality of devices within a building in response to the received data; and automatically generate one or more control signals to selected ones of the plurality of devices to shift energy loads in response to the determined energy demand.

6. The system of claim 1, wherein the instructions cause the processor to:

process the tagged data to generate one or more visualizations; and communicate data including the one or more visualizations to a computing device through the network.

7. A system comprises:

a plurality of edge analytics controllers, each edge analytics controller including:

a plurality of input/output (I/O) ports, each I/O port configured to receive data from a device of a plurality of devices;

a network interface configured to couple to a network, at least one of the plurality of edge analytics controllers is configured to communicate with another of the plurality of edge analytics controllers through the network;

a processor coupled to the I/O ports and to the network interface; and a memory accessible to the processor and storing instructions that cause the processor to:

receive data from a first device via a first I/O port of the plurality of I/O ports;

automatically apply semantic tags to the data to produce tagged data, the semantic tags including a device identifier and location data, the semantic tags including one or more of a manufacturer of the first device, a schedule associated with the first device, and a control parameter associated with the first device;

determine a pattern in the tagged data;

determine information based on the determined pattern;

determine one or more pre-defined rules for responding to the determined pattern based on the information;

determine one or more adjustments based on the one or more pre-defined rules;

provide one or more control signals to one or more of the plurality of I/O ports to control a plurality of building operations management tasks;

communicate first data including location, network address, device, and parameter information to other edge analytics controllers through the network;

receive second data including location, network address, device, and parameter information from one or more other edge analytics controllers through the network; and automatically determine a hierarchy between a first edge analytics controller and one or more other edge analytics controllers of the plurality of edge analytics controllers based on the first data and the second data.

8. The system of claim 7, wherein the instructions cause the processor to:

detect one or more anomalies in the tagged data; and diagnose a fault in a piece of equipment based on the one or more detected anomalies.

9. The system of claim 7, wherein the instructions cause the processor to:

receive input data corresponding to an occupant call;

determine at least one device corresponding to the input data corresponding to the occupant call; and automatically generate a control signal to the at least one device in response to receiving the input data corresponding to the occupant call.

10. The system of claim 7, wherein the instructions cause the processor to:

determine energy demand across the plurality of devices within a building based on the tagged data; and automatically generate one or more control signals to selected ones of the plurality of devices via respective ones of the plurality of I/O ports to shift energy loads in response to the determined energy demand.

11. The system of claim 7, wherein the instructions cause the processor to:

automatically determine a hierarchy between each of the plurality of edge analytics controllers, the plurality of edge analytics controllers including a first edge analytics controller and a second edge analytics controller; and wherein:

the second edge analytics controller of the plurality of controllers shares parameter data with the first edge analytics controller; and in response to a failure of the second edge analytics controller, the first edge analytics controller selectively assumes control of the second edge analytics controller or restores the parameter data to the second edge analytics controller.

12. A system comprising:

a plurality of controllers, each controller comprises:

a network interface configured to couple to a network;

a plurality of input/output (I/O) ports configured to couple to a plurality of devices, the plurality of I/O ports including a first I/O port coupled to a first device of the plurality of devices and including a second I/O port coupled to a second device of the plurality of devices;
a processor coupled to the network interface and to the plurality of I/O ports; and
a memory accessible to the processor and storing instructions that cause the processor to:
determine a network address;
communicate with one or more other devices through the network to automatically discover one or more other controllers of the plurality of controllers;
automatically determine a hierarchy between the controller and the one or more other controllers so that a first controller in the hierarchy provides control instructions to the one or more other controllers in the hierarchy;
receive data from one or more of the plurality of devices via one or more of the plurality of I/O ports;
automatically apply semantic tags to the data to produce tagged data;
process the tagged data according to one or more configurable instruction sets; and
process the tagged data to manage a plurality of building operations management tasks; and
wherein:
a second controller of the plurality of controllers shares parameter data with the first controller in the hierarchy; and
in response to a failure of the second controller, the first controller to selectively assume control of the second controller or restore the parameter data to the second controller.

13. The system of claim 12, wherein the instructions cause the processor to:
detect one or more anomalies a pattern within the received data; and
diagnose a fault in a piece of equipment based on detection of the one or more anomalies.

14. The system of claim 12, wherein the instructions cause the processor to:
receive input data corresponding to an occupant call;
determine at least one device of the plurality of devices corresponding to the input data of the occupant call; and
automatically generate a control signal to the at least one device in response to receiving the input data of the occupant call.

15. The system of claim 12, wherein the instructions cause the processor to:
determine energy demand across the plurality of devices within a building; and
automatically generate one or more control signals to selected ones of the plurality of devices to shift energy loads in response to determining the energy demand.

16. The system of claim 12, wherein the instructions cause the processor to:
receive data from one or more of the plurality of I/O ports;
automatically apply semantic tags to the data to produce tagged data;
process the tagged data to generate one or more visualizations; and
communicate data including the one or more visualizations to a computing device through the network.

* * * * *